A. H. MIDGLEY & C. A. VANDERVELL.
DYNAMO ELECTRIC MACHINERY.
APPLICATION FILED JULY 11, 1910.
1,057,759. Patented Apr. 1, 1913.
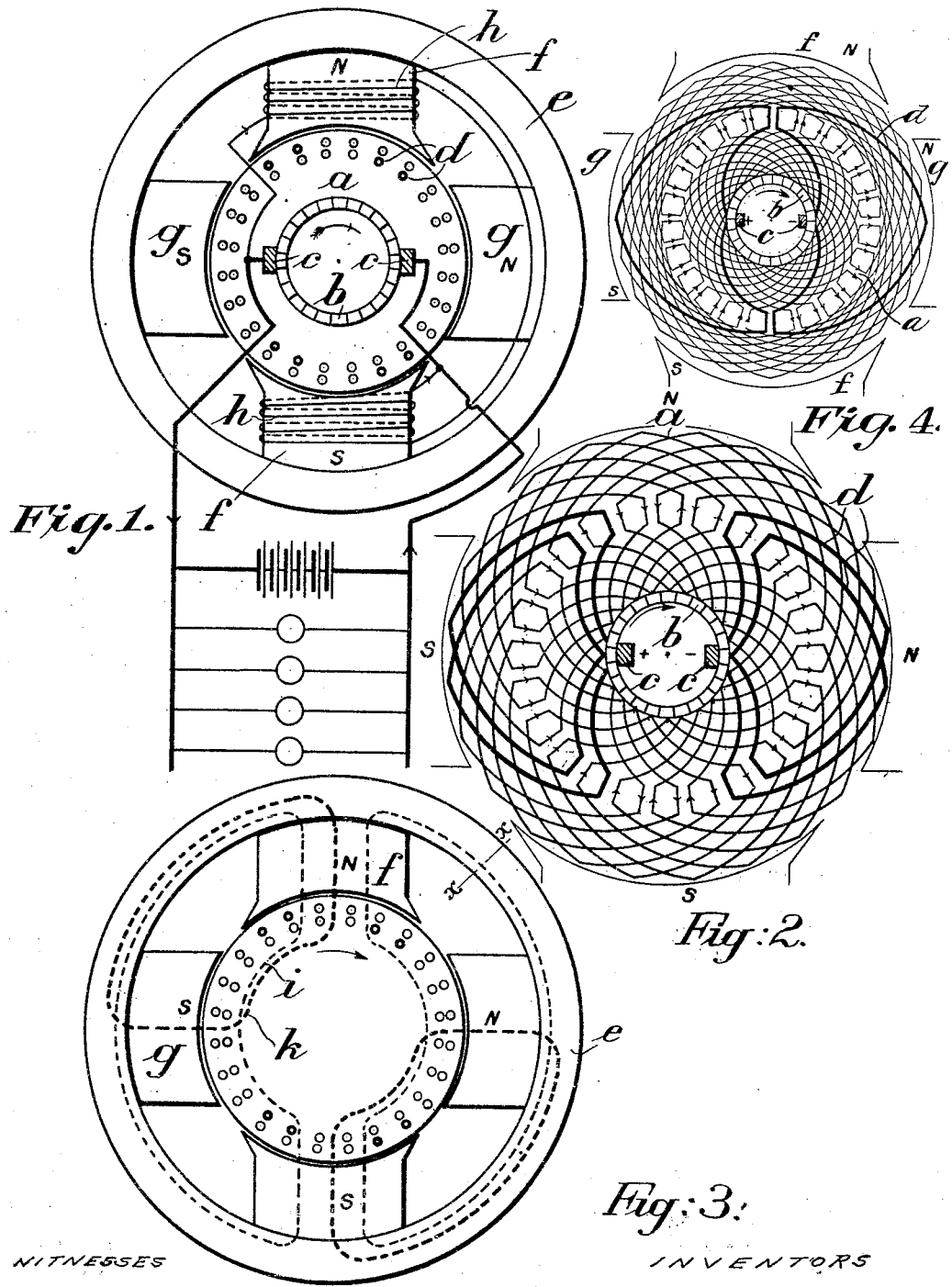

UNITED STATES PATENT OFFICE.

ALBERT HENRY MIDGLEY AND CHARLES ANTHONY VANDERVELL, OF ACTON VALE, ENGLAND.

DYNAMO-ELECTRIC MACHINERY.

1,057,759.  Specification of Letters Patent.  Patented Apr. 1, 1913.

Application filed July 11, 1910. Serial No. 571,351.

*To all whom it may concern:*

Be it known that we, ALBERT HENRY MIDGLEY and CHARLES ANTHONY VANDERVELL, subjects of the King of Great Britain and Ireland, residing at Warple Way, Acton Vale, Middlesex, England, have invented new and useful Improvements in Dynamo-Electric Machinery, of which the following is a specification.

This invention relates to dynamo electric machinery particularly of that class, in the case of a generator in which the rate of revolution is variable and is especially applicable to dynamos used for train lighting in conjunction with a battery of accumulators.

This invention has for its object the construction and arrangement of a machine which if desired can be used in either direction of rotation, so that in the case of a generator it will give a constant output at varying speeds, or a useful current at a constant voltage irrespective of the rate of rotation, while in the case of a motor supplied with current of a variable voltage, a constant speed is obtained.

This invention consists of a dynamo electric machine in which the brushes for collecting the useful current are arranged in such a position that the coil or coils of the armature short-circuited by the said brushes are in an active zone where they are cutting an initial magnetic flux due to wound poles, and the current thus generated in the short circuited coils, as distinguished from the working current which flows through the armature from brush to brush, acts to distort the said initial magnetic flux in a manner hereinafter explained in order to accomplish self-regulation.

If a dynamo electric machine has one magnetic field system acting upon an armature and the armature coils short-circuited by the brushes are centrally situated in the same plane as the magnetic flux, and if the reaction of the armature winding is in the same plane as the magnetic flux but directly opposing it, it is evident no current would be generated in the armature winding if the armature were rotated, as an equal number of conductors on opposite sides of the armature would be cut by a magnetic flux of the same polarity. This position of the brushes in an ordinary machine would also cause disastrous sparking at the brushes. If, however, the magnetic flux be distorted by some means to one side of the center of the plane of the short-circuited coils, then current is generated in the armature conductors when rotated in one direction, and, if the field be distorted in a similar way to the opposite side and the armature is rotated in the reverse direction, then the current generated in the armature conductors would still be in the same direction.

It is well known that in every armature in addition to its working current there would be another and local current produced in the coils short-circuited by the brushes if such short-circuiting took place at a moment when the coil is not situated in a neutral zone, and the magnitude of such local current depends, *ceteris paribus*, upon the strength of the magnetic flux and the speed at which the armature rotates. In carrying out our invention, we utilize this property of the local current in the short-circuited coils to produce a cross-magnetizing force in the armature to distort the magnetic flux to one side of the center of the plane of the short-circuited coils, and we also utilize the reaction of the working current in the armature winding to weaken the magnetic flux as the speed of the armature increases in order to obtain the desired self regulation.

In order that the invention may be the better understood, we will now proceed to describe the same in relation to the accompanying drawing, reference being had to the letters and figures marked thereon.

Like letters refer to like parts in the various figures.

Figure 1 is a diagrammatic representation of our invention as applied to a variable speed dynamo. Fig. 2 illustrates diagrammatically the chord winding of the armature which is preferably used, and indicating in heavy lines the short-circuited coils. Fig. 3 is a diagrammatic representation of the magnetic system showing the distortion of the initial magnetic flux from what may be termed subsidiary poles through main poles for a clockwise rotation of the armature, the undistorted flux and distorted flux being represented by thin and thick dotted lines respectively. Fig. 4 is a diagrammatical representation of an armature having diametrical drum winding, the short circuited coils being indicated in heavy lines.

In order to show one way in which the invention can be carried into effect we wind the armature $a$ on the chord principle preferably in the manner such as is described in British Patent No. 21938 of 1908 and is illustrated in Fig. 2 of the accompanying drawings, and to the commutator $b$ of the armature $a$ we provide one set only of brushes $c$. Each brush $c$ is adapted to short-circuit one or more individual armature coils $d$ (shown in thick lines) such short-circuiting taking place while said coils are cutting the magnetic flux from the subsidiary poles. We provide field magnets $e$ with such subsidiary poles $f$ disposed midway between the main poles $g$, these subsidiary poles being provided with a winding $h$ in conjunction with means such as a shunt circuit for energizing the said winding from the brushes $c$ $c$ of the generator. The main poles $g$ themselves are not provided with any winding at all, but as the subsidiary poles $f$ are excited independent of the main poles, the magnetic flux excited by the windings of the subsidiary poles $f$ will always have one direction so far as the subsidiary poles are concerned and will never be reversed. The brushes $c$ $c$ are so placed that the short-circuited coils $d$ cut the magnetic flux due to the subsidiary poles $f$ and the local current generated thereby in the said short-circuited coils $d$ will be reversed if the direction of rotation is reversed. The local current generated in the short-circuited coils $d$ sets up a cross-magnetizing force which distorts the magnetic flux from the path $i$ into the path $k$ approximately at right angles to the subsidiary poles $f$, which distorted flux thus generates the working current in the armature winding $a$. It will be noted that as this distortion of the magnetic flux is produced by the local current of the short-circuited coils $d$ such distortion will be directed toward one side or the other according to the direction of rotation of the armature, and the working current taken from the brushes $c$ $c$ will always be in one direction. It will be understood that as the working current taken from the armature $a$ increases, the armature reaction produced thereby being in approximately the same plane and of opposite polarity to the magnetic flux due to the subsidiary poles $f$, the said flux is weakened and consequently the local current generated in the short-circuited coils $d$ is reduced while the output is kept practically constant.

It must be understood that although we have described the armature wound with a chord winding as one way of carrying out the invention we may use an ordinary diametrical drum winding, as shown in Fig. 4, but we prefer the chord winding, particularly the specific form of chord winding referred to.

We are aware that it has been proposed to construct a self regulating dynamo having two magnetic fields which do not coalesce and which have different paths, the axes of these fields being displaced relatively to each other approximately 90° and acting upon a single armature with one or two windings, one field never becoming reversed so that a ond field changing with the direction of rotation is supplied from the armature brushes appertaining thereto, and the second field changing with the direction of rotation and induced by the above mentioned current so that the armature brushes appertaining thereto have a constant polarity independent of the direction of rotation; a necessary feature being that the direct action of each field on the winding which does not appertain to it shall be small. In our invention only a single magnetic flux results which acts on all the armature conductors and only one set of brushes is requisite to collect the working current and set up the self-regulating features.

It is quite common to use the reactions in an armature or in the windings of an armature, or in so much of a winding as is for the moment in circuit between brush and brush to give a regulating effect, but the function is quite different from that of currents generated in a coil or coils when bridged at the commutator by a brush in accordance with our invention. In all ordinary dynamos and motors the brushes from which the working current is taken are, for the purpose of sparkless commutation, either set at such positions that the individually short-circuited coils are in a neutral field, where therefore no local short-circuit current would be generated, or else they are set at such a position, by being given a lead or by being set near a commutating pole, that any electromotive force induced in the coils tends to reverse or neutralize any short-circuited current in them, whereas in our invention the brushes are so placed that the coil or coils locally short-circuited thereby are in the active zone of the magnetic flux.

Having thus fully described our invention, we claim as new and desire to secure by Letters Patent:—

In a dynamo electric machine, in combination, a generator armature, brushes sufficiently broad to short circuit individual coils in the said armature, poles provided with windings to excite current in said short circuited armature coils on rotation of the armature, unwound poles arranged approximately at right angles to the plane of the said short circuited armature coils to permit the diversion of the flux through the said poles due to the influence of the said short circuited coils so that such diverted flux is utilized to produce the working current in the external circuit connected to the said short circuiting brushes, substantially as described.

In testimony whereof we have signed our names to this specification in the presence of two subscribing witnesses.

ALBERT HENRY MIDGLEY.
CHARLES ANTHONY VANDERVELL.

Witnesses:
RICHARD A. HOFFMANN,
CHARLES J. R. BULLOUGH.

Copies of this patent may be obtained for five cents each, by addressing the "Commissioner of Patents, Washington, D. C."